2,717,253

PREPARATION OF METHIONINE HYDANTOIN

David Oliver Holland, Dorking, England, assignor to Beecham Research Laboratories Limited, Betchworth, England, a company of Great Britain No Drawing. Application December 15, 1952,
Serial No. 326,169

Claims priority, application Great Britain
December 21, 1951

14 Claims. (Cl. 260—309.5)

This invention is an improved process for the preparation of methionine hydantoin (5-β-methylthioethyl-hydantoin) from β-methylthiopropaldehyde.

It is known that hydantoins may be prepared from aldehydes by the so-called Bucherer reaction, i. e. treating the corresponding aldehydes with ammonium carbonate (or its chemical equivalents such as ammonium bicarbonate, ammonium carbamate or ammonia and carbon dioxide) and an inorganic cyanide, e. g. an alkali or alkaline earth metal cyanide.

It is the object of the present invention to provide an improvement of this process, as applied to the preparation of methionine hydantoin, whereby increased yields may be obtained without prolonged heating.

This object is achieved according to the invention, by performing it in the presence of a tertiary alkylamine, e. g. triethylamine, trimethylamine or tri-n.butylamine, the former being preferred. It is preferred to use at least one molecule of the amine per molecule of the aldehyde.

The reaction in the present process takes place at ordinary temperature over a period of several hours or with the application of heat over a much shorter period e. g. boiling under reflux conditions or otherwise for 15 to 30 minutes.

Methionine hydantoin may be hydrolysed to give methionine which is well known to be a vital factor in human and animal nutrition. Methionine has also a valuable therapeutic action in the case, for example, of certain liver diseases.

The invention is illustrated in the following example:

A solution of sodium cyanide (2.7 g., 0.055 mole) and ammonium carbonate (10.6 g., 0.11 mole) in water (25 ml.) was diluted with alcohol (25 ml.) and triethylamine (0.05 mole). After standing at ordinary temperature for 10 minutes with occasional shaking there was added β-methylthiopropaldehyde (5 ml., 0.05 mole). The mixture was then allowed to stand at ordinary temperature for 24 hours or refluxed vigorously for 15 minutes. The mixture was then concentrated to a small volume under reduced pressure and made strongly acid with concentrated hydrochloric acid. After standing for some hours in the refrigerator the pale precipitate of methionine hydantoin was collected and washed with a little cold water, the filtrate being concentrated to yield a second crop. A yield of 90–95% was obtained.

By using hydrogen cyanide instead of sodium cyanide or its equivalent the crude reaction product can be converted to methionine without isolation of the hydantoin by adding the desired alkaline hydrolysing agent after concentration, distilling to remove further triethylamine and then hydrolysing in any convenient manner.

The process also lends itself to continuous operation which may include the continuous removal of vapours to give directly a concentrated reaction product. Particularly, therefore, when hydrogen cyanide is used, methionine may be prepared from β-methylthiopropaldehyde in a continuous manner.

When using trimethylamine the reaction procedure is similar to that when triethylamine is used. On the other hand, in the case when tri-n.butylamine is used it is preferable, since this amine is barely soluble in water, to shake the reaction mixture continuously for 24 hours or to reflux it vigorously for 30 minutes. Also, since it is not volatile at the temperature at which the final reaction mixture is concentrated, the working-up procedure requires to be modified. For example, after concentrating under reduced pressure to remove alcohol the residual solution, which contains a considerable upper oily layer, is extracted with chloroform. The chloroform solution, which contains tributylamine, is then itself extracted first with 10% sodium hydroxide solution (20 ml.) and then with water. The extracts are added to the original aqueous phase and the mixture made strongly acid with concentrated hydrochloric acid. Concentration in the usual way then yields the hydantoin.

I claim:

1. Process for preparing methionine hydantoin by reacting β-methylthiopropaldehyde with an ammonium carbonate and an inorganic cyanide in the presence of a tertiary alkylamine.

2. Process for preparing methionine hydantoin by reacting β-methylthiopropaldehyde with an ammonium carbonate and an inorganic cyanide in the presence of triethylamine.

3. Process as claimed in claim 1 performed without applying heat.

4. Process as claimed in claim 2 performed without applying heat.

5. Process as claimed in claim 1 in which the reaction mixture is boiled for a short period.

6. Process as claimed in claim 2 in which the reaction mixture is boiled for a short period.

7. Process as claimed in claim 1 in which at least one molecule of the amine per molecule of the aldehyde is used.

8. Process as claimed in claim 2 in which at least one molecule of the amine per molecule of the aldehyde is used.

9. Process for preparing methionine hydantoin by reacting β-methylthiopropaldehyde with an ammonium carbonate and hydrogen cyanide in the presence of a tertiary alkylamine.

10. Process for preparing methionine hydantoin by reacting β-methylthiopropaldehyde with an ammonium carbonate and hydrogen cyanide in the presence of triethylamine.

11. Process for preparing methionine hydantoin by reacting β-methylthiopropaldehyde with an ammonium carbonate and an alkali metal cyanide in the presence of a tertiary alkylamine.

12. Process for preparing methionine hydantoin by reacting β-methylthiopropaldehyde with an ammonium carbonate and an alkali metal cyanide in the presence of triethylamine.

13. Process for preparing methionine hydantoin by reacting β-methylthiopropaldehyde with an ammonium carbonate and an alkaline earth metal cyanide in the presence of a tertiary alkylamine.

14. Process for preparing methionine hydantoin by reacting β-methylthiopropaldehyde with an ammonium carbonate and an alkaline earth metal cyanide in the presence of triethylamine.

References Cited in the file of this patent

UNITED STATES PATENTS

| | | |
|---|---|---|
| 2,409,754 | Henze | Oct. 22, 1946 |
| 2,557,913 | Livak et al. | June 19, 1951 |
| 2,642,459 | White | June 16, 1953 |

OTHER REFERENCES

Pierson et al., J. Am. Chem. Soc., vol. 70, pp. 1450–51 (1948).